United States Patent Office 2,939,558
Patented June 7, 1960

2,939,558

TRANSMISSION

Hans O. Schjolin, Birmingham, Mich., assignor to General Motors Corporation, Detroit, Mich., a corporation of Delaware Filed June 9, 1958, Ser. No. 740,618

13 Claims. (Cl. 192—3.6)

This invention relates to a transmission and a combined main clutch and two-speed drive unit.

This main clutch and two-speed drive unit is particularly adapted for use between the power plant and a multiratio gear unit; such as, a sliding gear or synchromesh transmission normally used in vehicles. This unit has the same space requirements as a conventional main clutch unit and thus may replace the conventional clutch unit. The main clutch assembly is mounted on the engine driven flywheel and has a plurality of annular clutch driving plates and driven plates having a large internal diameter to provide a large internal space for a two-speed planetary gear unit. The carrier of the two-speed planetary gear unit is driven by the clutch driven plates, and the ring gear is connected to the output shaft; and the sun gear is connected to a control sleeve to establish direct drive in the gear unit when the control sleeve is clutched to the output shaft or overdrive in the gear unit when the control sleeve is connected to the housing by a brake. The main clutch release mechanism consisting of a Belleville spring and throwout bearing is located between the planetary gear unit and the clutch and brake mechanism and is rotatably mounted on the control sleeve between these elements. The ratio clutch is applied by a fluid motor which is biased to the release position by the centrifugal pressure head created due to the rotation of the motor cylinder mounted on the output shaft. The motor cylinder is constructed so that the force due to the centrifugal pressure heads on the apply and release side provides a retraction force. The brake mechanism is applied by a spring and hydraulically released permitting a simple hydraulic control which supplies fluid to apply the clutch and release the brake to establish direct drive and which releases the fluid to release the clutch and permit the spring to apply the brake to establish overdrive.

An object of the invention is to provide an improved main clutch and two-speed gear unit having fluid actuated friction devices to establish a plurality of ratios.

Another object of the invention is to provide in a main clutch and two-speed transmission unit a concentrically located main clutch and two-speed planetary gear unit and a concentrically located brake unit and clutch unit connected by a control sleeve which provides a mounting for the main clutch release mechanism.

Another object of the invention is to provide in a transmission having a plurality of fluid operated ratio engaging devices and a control sleeve located between said ratio engaging devices, a fluid clutch motor rotatably mounted on a shaft and a brake motor having independent annular piston and cylinder members mounted on the transmission housing.

Another object of the invention is to provide in a rotatable fluid motor device having a movable wall and pair of chambers, one fluid supply connected to merely fill one chamber, another fluid supply to at times supply a higher pressure to move the movable wall in one direction and at times merely fill the other chamber and the chambers being formed so that the resultant force of the centrifugal pressure head in both chambers acts to move the movable wall in the other direction.

Another object of the invention is to provide in a rotatable fluid motor device having an apply chamber and a release chamber having a larger diameter located on opposite sides of the piston so that on release of fluid pressure supplied to the apply chamber, the pressure in the apply and release chambers generated by centrifugal force due to the rotation of the cylinder will provide a fluid force acting on the piston to move the piston in the release direction.

These and other objects of the invention will be more apparent from the following description and drawings of a preferred embodiment of the invention.

Figure 1:
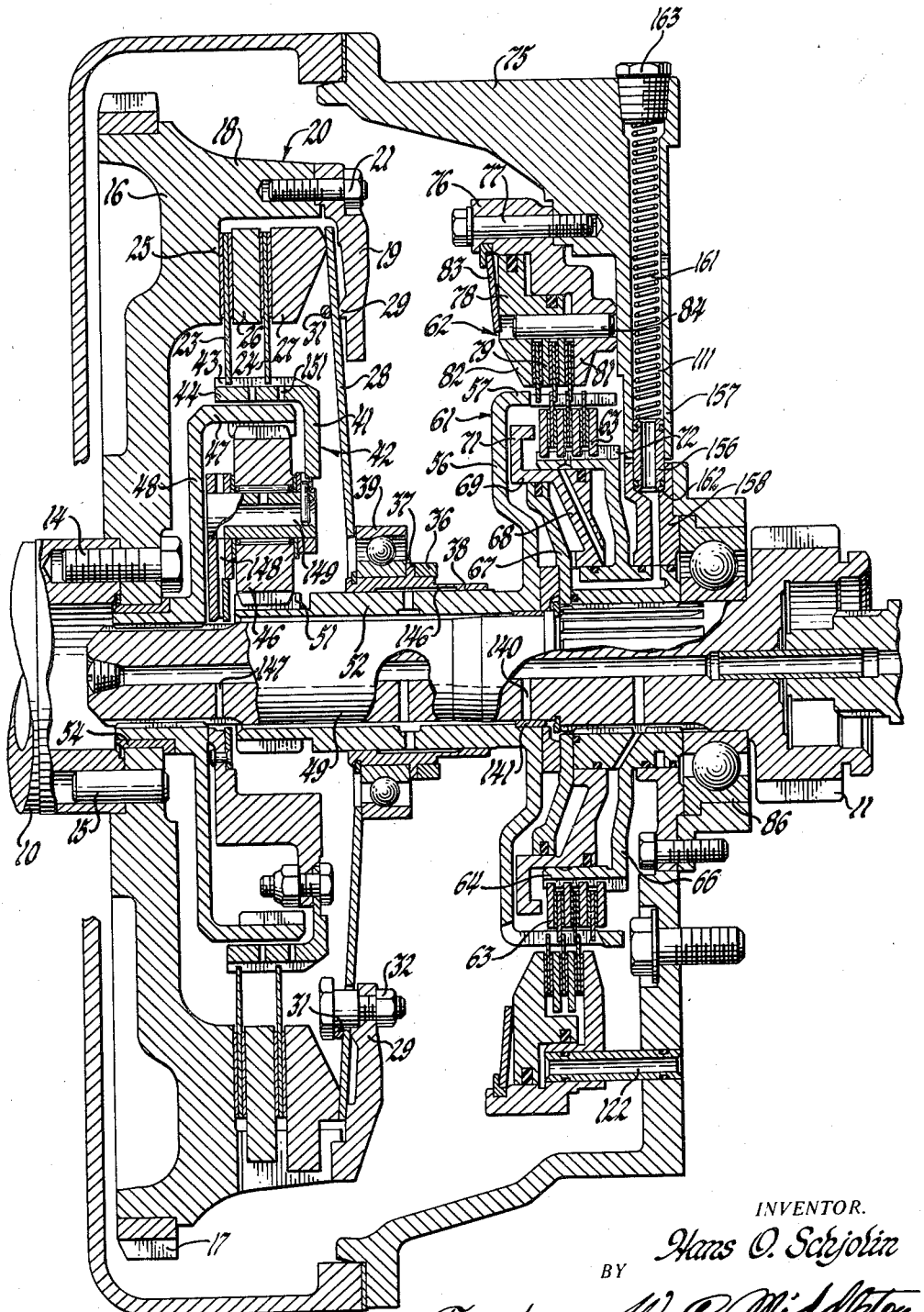
Fig. 1 is a partial assembly view with parts in section showing the main clutch and two-speed transmission unit.
Figure 2:
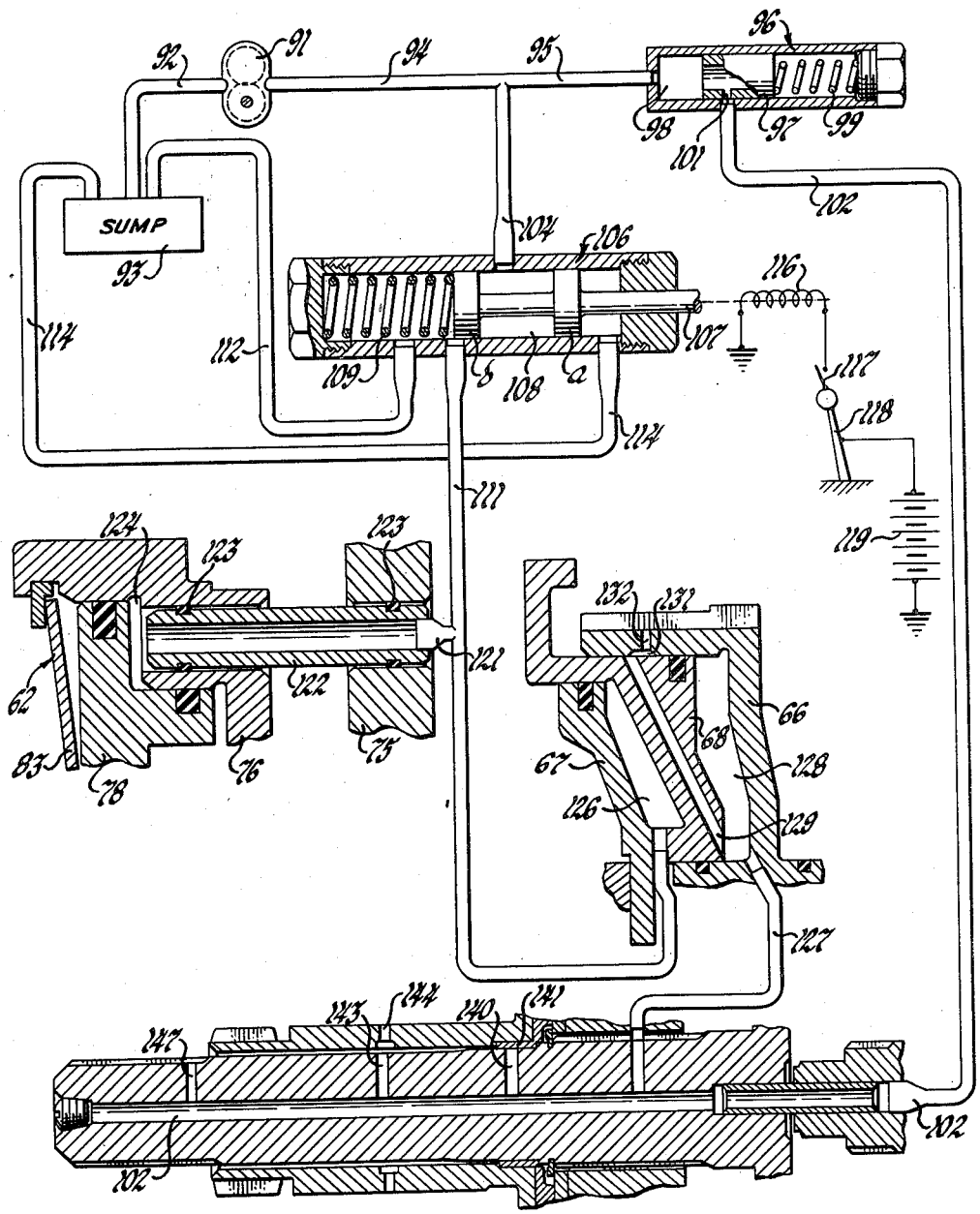
Figure 2 is a diagrammatic view showing the hydraulic control system for this transmission unit.

The main clutch and two-speed transmission unit shown in Fig. 1 is intended to be driven by the engine output shaft 10 and drive a conventional input gear 11 of a sliding gear transmission generally of the synchromesh type. The input shaft 10 is secured by bolts 14 and the pin 15 to the flywheel 16 having the conventional starting gear 17. The flywheel 16 has adjacent its outer diameter a rearwardly projecting annular portion 18 having an inwardly projecting annular support flange 19 secured thereto by studs 21 for the clutch 20. The driven clutch plates 23 and 24 are located between the fixed driving plate 25 provided by the adjacent face of the flywheel 16, the intermediate driving plate 26 and the movable driving plate 27. The clutch 20 is applied by the Belleville spring 28 which is pivoted at a point intermediate its length between the annular abutment 29 on the flange 19 and an annular wire abutment 31 secured to the flange 19 by a series of bolts 32. The conventional clutch release pedal is employed to actuate a clutch release fork 36 which engages a shoulder 37 on the clutch release sleeve 38 and, through the thrust bearing 39, moves the inner portion of the spring 28 forward to release clutch 20.

The input shaft or engine shaft 10 is connected by the flywheel 16 and main clutch 20 to the carrier 41 of the planetary gear unit 42. The driven plates 23—24 of clutch 20 are drivingly connected by splines 43 on a drum portion 44 of the carrier 41 which permit axial movement. The carrier supports a plurality of planetary pinions 46 each meshing with ring gear 47 connected by hub 48 to output shaft 49 and a sun gear 51 formed as a part of the control sleeve 52. The hub 48 and output shaft 49 are rotatably mounted in a pilot bearing 54 in the flywheel. The control sleeve 52 is rotatably mounted on shaft 49 and provides a support for the clutch sleeve 38.

The control sleeve 52 at its rearward portion has a hub portion 56 connecting the drum portion 57 to the control sleeve so that the ratio engaging device or clutch 61 may secure the sleeve to the output shaft 49 or the ratio engaging device or brake 62 may secure the control sleeve to the housing 75.

The clutch 61 consists of a plurality of plates 63 with alternate plates splined to the outer drum portion 64 of the cylinder 66 which is splined to the output shaft 49 and with intermediate plates splined to the drum 57. The other end of the cylinder is formed by the wall 67 which is also splined to the output shaft 49. A piston 68 is located within the cylinder 66—67 and has at its outer diameter a cylindrical extension 69 extending out of the cylinder between the drum portion 64 and wall 67. The piston extension 69 supports the movable pressure plate 71. When the piston 68 moves to the right as viewed in Fig. 1 plate 71 engages the adjacent alternate plate and moves the plates into contact since the alternate plate at the other end is held by a shoulder 72 formed on the splined drum 64.

The brake 62 is a separate assembly and is mounted in the transmission housing 75 as a unit. The cylinder 76 is secured to the housing 75 by bolts 77 and provides an L-shaped cylinder for the L-shaped piston 78. The brake plates 79 are located between the fixed plate 81 formed as a portion of cylinder 76 and a pressure plate 82 formed as a portion of the piston 78 with alternate plates splined to drum 57 and intermediate plates fixed by pin 84. The piston 78 is constantly urged toward the engaged position by an annular spring 83 and retained against rotation by pin 84. The rear portion of the output shaft 49 is rotatably mounted by a suitable bearing 86 in the housing 75.

The control system employs fluid under pressure supplied by a pump 91 which may be driven either by the engine or the transmission. The pump is connected by intake line 92 to a source of fluid or sump 93 and supplies fluid to the system via main line 94 which has a branch 95 connected to the pressure regulator valve 96 to regulate the main line pressure at a high value. The pressure regulator valve has a piston 97 located in a cylinder 98 and a spring 99 biasing the piston 97 to the operating position shown, in which there is a limited exhaust through the orifice 101 to the lubricating line 102. An increase in pressure in the main line 94 above the predetermined regulated pressure will move the piston 97 to the right to open an unrestricted passage between the main line branch 95 and lubricating line 102.

Main line 94 also has a branch 104 connected to the control valve 106 which is shown in the closed or overdrive position. The valve element 107 having lands $a$ and $b$ of equal diameter located in the bore 108 closed at both ends is biased by the spring 109 to the closed position. Valve 106 in the closed position connects the control line 111 to the exhaust line 112 which is connected to the sump 93. The main line 104 is blocked between the lands $a$ and $b$. The space between the land $a$ and the end of the bore 108 is vented by an exhaust line 114.

The valve may be actuated by a solenoid 116 controlled by a suitable electric switch 117, which may be located as shown on the transmission control lever 118, by connecting a source of power such as the battery 119 to actuate the solenoid 116.

When the valve element 107 is moved by the solenoid against the spring 109, main line 104 is connected between the main lands $a$ and $b$ to the control line 111 and which is disconnected from the vent line 112. The main line 111 has a branch 121 which is formed in part by a sleeve 122 having a portion in a housing 75 and a portion in a cylinder member 76 and sealed thereto by O rings 123. Fluid pressure, supplied by line 111 via branch 121—122, enters the cylinder 76 and moves the piston 78 to the released position against the biasing force of spring 83 to release the brake 62. At the same time fluid under pressure is supplied by line 111 to the chamber 126 of cylinder 66—67 to move the piston 68 to the right to engage the clutch 61.

A lubricating fluid supply line 102 providing a very low pressure supply is also connected by branch 127 to the right chamber of cylinder 66 and 67 to completely fill this chamber. However, pressure does not develop in the chamber 128 since this chamber is vented by the exhaust line 129 which originates substantially at the inner diameter of the annular piston 68 and extends to the outer wall of the piston where it is connected by a transfer groove 131 to a passage 132 which conducts lubricating oil to the plates of the clutch 61 and the brake 62.

When the valve 106 is moved to the closed position venting line 111, the brake chamber 124 is vented permitting the spring 83 to move the piston 78 to the apply position to engage the brake 62 for overdrive. At the same time the fluid in chamber 126 is vented via line 111 to permit retraction of the piston 68. The chamber 126 will remain filled with fluid since the cylinder 66—67 is rotating. The chamber 128 will also be filled with fluid supplied by the lubricating line 102. Centrifugal force due to the rotation of the cylinder 66—67 creates a pressure head in both chambers 126 and 128. However, due to the fact that chamber 128 has a greater radius, the pressure in chamber 128 will exceed the pressure in chamber 126. The fluid in chamber 128 also contacts a larger area of piston 68 than the fluid in chamber 126. Thus, a retraction force is provided to move the piston to the left to release the clutch 61.

Lubricating fluid is supplied by branch line 140 to the bearing 141 between the output shaft 49 and the control sleeve 52 and by the branch line 143 and transfer port 144 and lubricating space 146 to lubricate the bearing surfaces between the control sleeve 52 and clutch release sleeve 38. The planetary gear unit 42 and clutch 20 are lubricated by the branch 147 which supplied fluid via passages 148 and 149 to lubricate the planetary gear unit and passages 151 to lubricate the main clutch.

The passage 111 as shown structurally in Fig. 1 has a bushing 156 bridging the parting line between the two parts 157—158 of housing 75 and is sealed to each part by an O ring. A spring 161 located in the passage 111 in part 157 holds the bushing 156 in place against a shoulder 162 in part 158. The spring 161 is held in place by plug 163.

The above described preferred embodiment is illustrative of the invention and it will be apparent to those skilled in the art that modifications may be made within the scope of the appended claims.

I claim:

1. In a control system, a rotating fluid motor having a cylinder mounted for rotation about an axis and a movable wall located in said cylinder dividing said cylinder into a first chamber and a second chamber, means to keep said second chamber filled with fluid at all times and to maintain a substantially zero pressure in said second chamber near the axis, means for controlling said movable wall including means to supply fluid to said first chamber under pressure to move said movable wall in one direction and means to relieve the pressure of fluid supplied to said first chamber to permit movement in the opposite direction, and said first and second chambers having means responsive to the centrifugal pressure head developed in said first and second chambers to provide a total biasing force to move said movable wall in the opposite direction to provide a retraction force.

2. In a control system, a rotating fluid motor having a cylinder mounted for rotation about an axis and a movable wall located in said cylinder dividing said cylinder into a first chamber, said movable wall having a larger area exposed to said second chamber than the area exposed to said first chamber, and a second chamber, means to keep said second chamber filled with fluid at all times and a vent located near the axis to maintain a substantially zero pressure in said second chamber near the axis, means for controlling said movable wall including means to supply fluid to said first chamber under pressure to move said movable wall in one direction and means to relieve the pressure of fluid supplied to said first chamber to permit movement in the opposite direction, and said second chamber having a larger area acted on by the centrifugal pressure head developed in said second chamber than the area acted on by the centrifugal pressure head developed in said first chamber to bias said movable wall for movement in the opposite direction to provide a retraction force.

3. In a control system, a rotating fluid motor having a cylinder mounted for rotation about an axis and a movable wall located in said cylinder dividing said cylinder into a first chamber and a second chamber, means to keep said second chamber filled with fluid at all times and a vent connected to second chamber near the axis to maintain a substantially zero pressure near the axis, means for controlling said movable wall including means to supply fluid to said first chamber under pressure to move said movable wall in one direction and means to relieve the pressure of fluid supplied to said first chamber and keep said first chamber filled with fluid, and said first and second chambers having means responsive to the centrifugal pressure head developed by the fluid in said first and second chambers to provide a total biasing force to move said movable wall in the opposite direction to provide the sole retraction force.

4. In a control system for a transmission, a rotating fluid motor having a cylinder mounted for rotation about an axis and a movable wall located in said cylinder and dividing said cylinder into an apply chamber and a release chamber, said movable wall having an apply area exposed to said apply chamber and a release area exposed to said release chamber, said release area having a larger diameter about the axis of the transmission and a larger area than said apply area, means to keep said release chamber filled with fluid and to maintain substantially zero pressure in said release chamber near the axis at all times to provide a body of fluid in said release chamber subject to centrifugal force to provide a retraction force acting on said movable wall, and means for controlling said movable wall including means to supply fluid to said apply chamber under pressure to move said movable wall in the apply direction and means to relieve the pressure of fluid supplied to said apply chamber to permit said retraction force to return said movable wall.

5. In a control system for a transmission, a fluid motor mounted for rotation about an axis, said fluid motor having a cylinder, a movable wall dividing said cylinder into a pair of chambers, a low pressure fluid supply connected to one chamber, a high pressure fluid supply, means for controlling said movable wall including means connecting said high pressure fluid supply at times to the other chamber to move said movable wall in one direction and disconnecting said high pressure fluid supply from said another chamber without draining said another chamber, means to vent and at the same time keep said one fluid chamber filled with fluid, said chambers being formed so that the resulting force of the centrifugal pressure head in both chambers acts to move said movable wall in the opposite direction.

6. In a control system for a transmission, a fluid motor mounted for rotation about an axis, said fluid motor having a cylinder, a movable wall dividing said cylinder into a pair of chambers, a source of fluid under pressure, means connecting said source to one chamber, vent means connected to said one chamber adjacent the axis, means connecting said source at times to the other chamber to admit fluid under pressure thereto to move said movable wall in one direction and disconnecting said source from said another chamber without draining said another chamber, said chambers being formed so that the resulting force of the centrifugal pressure head in said chambers acts to move said movable wall in the opposite direction.

7. In a control system for a transmission, a pair of members rotatable about an axis, annular friction clutch means connecting and disconnecting said pair of members, a rotatable motor mounted for rotation with one of said members about the axis and located within said annular friction clutch means, said motor having a cylinder and a movable wall dividing said cylinder into a first and second chamber, means to continuously supply fluid under pressure to said second chamber, means to continuously vent said second chamber at a point near the axis to maintain a very low pressure near the axis and conduct the fluid to said annular friction clutch means to cool and lubricate said clutch means, and said cylinder and movable wall being formed to provide first and second chambers located at a distance with respect to the axis and shaped to produce a biasing force acting in one direction in response to the centrifugal pressure head of the fluid in said chambers.

8. In a control system for a transmission, a pair of members rotatable about an axis, annular friction clutch means connecting and disconnecting said pair of members, a rotatable motor mounted for rotation with one of said members about the axis and located within said annular friction clutch means, said motor having a cylinder having a movable wall dividing said cylinder into a first and second chamber, said movable wall having a first area exposed to the fluid acting in said first chamber and a second area exposed to the fluid acting in said second chamber, means to continuously supply fluid under pressure to said second chamber, means including a passage in said movable wall to continuously vent said second chamber at a point near the axis and conduct the fluid to said annular friction clutch means to cool and lubricate said clutch means, means to supply fluid under pressure at times to said first chamber to move said movable wall in one direction and to vent said first chamber at a point adjacent the axis at other times, said cylinder and movable wall being formed to provide said first and second areas exposed to fluid acting in said first and second chambers located at a distance from the axis and shaped to produce a biasing force acting in the opposite direction in response to the centrifugal pressure head of the fluid in both of said chambers.

9. In a transmission, an input, an output, a flywheel connected to said input, an annular clutch assembly having an annular drive plate drivingly connected to said flywheel, an annular driven plate, and means to engage said plates including an annular Belleville spring pivotally mounted on and spaced from said flywheel, a planetary gear unit located between said flywheel and said Belleville spring and having a carrier, a sun gear and a ring gear member, said carrier member having pinions meshing with said ring and sun gear members, one member being connected to said driven plates, another member being connected to said output, a gear control sleeve rotatably mounted on said output extending through said Belleville spring and connected to the third member at one side of said Belleville spring, clutch control means rotatably mounted on said gear control sleeve and engaging said Belleville spring, said gear control sleeve having a control portion located on the other side of said Belleville spring, brake means connected to said control portion to hold said control portion and control sleeve, a clutch cylinder mounted for rotation with said output having a piston therein dividing said cylinder into an apply chamber and a release chamber, clutch means actuated by said piston to connect said control portion and said output, means to continuously keep said clutch release chamber filled with fluid and said clutch apply and release chambers being formed so that the centrifugal force acting on the fluid in said clutch release and clutch apply chambers urges said clutch piston in a releasing direction.

10. In a transmission, a housing, an input, an output, a flywheel connected to said input, an annular clutch assembly having an annular drive plate drivingly connected to said flywheel, an annular driven plate, and means to engage said plates including an annular Belleville spring pivotally mounted on and spaced from said flywheel, a planetary gear unit located between said flywheel and said Belleville spring and having carrier, sun gear and ring gear members, said carrier member having pinions meshing with said ring and sun gear members, one member being connected to said driven plate, another member being connected to said output, a gear control sleeve rotatably mounted on said output extending through said Belleville spring and connected to the third member at one side of said Belleville spring, clutch control means rotatably mounted on said gear control sleeve and engaging said Belleville spring, said gear control sleeve having a drum portion radially spaced from said output and located on the other side of said Belleville spring, an annular brake cylinder secured to said housing and having a fixed brake plate, an annular piston located in said cylinder having a brake apply plate, an intermediate brake plate keyed to said drum and located between said fixed brake plate and said brake apply plate, spring means biasing said piston to the engaged position, a clutch cylinder mounted for rotation with said output having a movable wall therein dividing said cylinder into an apply chamber and a release chamber, clutch plates alternately splined to said clutch cylinder and said drum, said movable wall having means engaging said clutch plates, means to continuously keep said clutch release chamber filled with fluid and said clutch apply and release chambers being formed so that the centrifugal force acting on the fluid in said clutch delease and clutch apply chambers urges said clutch piston in a releasing direction.

11. In a transmission, a housing, an input member, an output member, a flywheel connected to said input member and having a rearwardly projecting cylindrical flange and a support flange projecting inwardly from said rearwardly projecting flange and spaced from said flywheel, an intermediate driving plate and a pressure plate keyed to said flywheel for rotary movement with said flywheel and relative axial movement, a clutch driven plate located between said flywheel and said intermediate plate and a second clutch driven plate located between said intermediate plate and said pressure plate, an annular Belleville spring pivotally mounted on said support flange and engaging said pressure plate, a planetary gear unit located between said flywheel and said Belleville spring and having a carrier, a sun gear and a ring gear, said carrier drivingly connected to said clutch driven plates and having pinions meshing with said ring and sun gears, said ring gear drivingly connected to said output member, a gear control sleeve rotatably mounted on said output member and connected to said sun gear at one side of said Belleville spring, a clutch control sleeve rotatably mounted on said gear control sleeve and having throwout bearing means engaging said Belleville spring, means to actuate said clutch control sleeve to engage and disengage said clutch, said gear control sleeve having a drum portion radially spaced from said output and located on the other side of said Belleville spring, an L-shaped annular brake cylinder secured to said housing and having a brake plate, an L-shaped annular piston located in said cylinder having a brake plate, an intermediate brake plate keyed to said drum and located between said brake plates, spring means biasing said piston to the engaged position, a clutch cylinder mounted for rotation with said output member having a piston therein dividing said cylinder into an apply chamber and a larger diameter release chamber, clutch plates alternately splined to said clutch cylinder and said drum, said piston having means engaging said clutch plates, means to supply fluid to said clutch cylinder to apply said clutch and to said brake cylinder to release said brake, means to continuously keep said clutch release chamber filled with fluid so that the centrifugal force acting on the fluid in said clutch release and clutch apply chambers urges said clutch piston in a releasing direction.

12. In a control system for a transmission, an outer drum, an inner drum located concentrically within said outer clutch drum, a plurality of friction plates located between said inner and outer drums and having alternate plates attached to said inner drum and intermediate plates attached to said outer drum, a fixed abutment secured to one of said drums, said inner drum forming the outer cylindrical wall of a fluid motor cylinder, said cylinder having an inner cylindrical wall, one annular end wall connecting one end of said inner drum to said inner cylindrical wall and another end wall secured to said inner cylindrical wall and having a circular edge having a diameter less than the diameter of the inner surface of said inner drum to provide an annular space, an annular piston located in said cylinder having an annular portion extending through said annular space between the other end wall and said inner drum, an apply plate fixed to said annular extension engaging said plates, a piston driving said cylinder into a release chamber adjacent said one end and an apply chamber adjacent said other end, a low pressure fluid supply continuously supplying said release chamber, a vent passage originating at the inner portion of said release chamber extending through said piston and inner drum to drain fluid from said release chamber to substantially prevent pressure buildup at the inner portion of said release chamber and to supply fluid to cool said plates, a high pressure fluid supply, means connecting said high pressure fluid supply at times to said apply chamber to act on said piston to engage said plates and at times disconnecting said high pressure fluid supply from said apply chamber without draining said apply chamber whereby said fluid in said release chamber acting on a larger area at a larger mean radius provides a retraction force due to the centrifugal pressure head acting on the fluid in the release chamber to overcome the force of the fluid acting under a centrifugal pressure head in the apply chamber to release the plates.

13. In a control system for a transmission, an outer drum, an inner drum located concentrically within said outer drum, a plurality of friction plates located between said inner and outer drums and having alternate plates attached to said inner drum and intermediate plates attached to said outer drum, a fixed abutment secured to one of said drums, said inner drum forming the outer cylindrical wall of a fluid motor cylinder, said fluid motor cylinder having an inner cylindrical wall, one annular end wall connecting one end of said inner drum to said inner cylindrical wall and another end wall secured to said inner cylindrical wall and having a circular edge having a diameter less than the diameter of the inner surface of said inner drum to provide an annular space, an annular piston located in said cylinder having an annular portion extending through said annular space between the other end wall and said inner drum, an apply plate fixed to said annular extension engaging said plates, a piston driving said cylinder into a release chamber adjacent said one end and an apply chamber adjacent said other end, a low pressure fluid supply continuously supplying said release chamber, a vent passage originating at the inner portion of said release chamber to drain fluid from said release chamber to substantially prevent pressure buildup at the inner portion of said release chamber and to supply fluid to cool said plates, a high pressure fluid supply, means connecting said high pressure fluid supply at times to said apply chamber to act on said piston to engage said plates and at times disconnecting said high pressure fluid supply from said apply chamber without draining said apply chamber whereby said fluid in said release chamber acting on a larger area at a larger mean radius provides a retraction force due to the centrifugal pressure head acting on the fluid in the release chamber to overcome the force of the fluid acting under a centrifugal pressure head in the apply chamber to release the plates.

References Cited in the file of this patent

UNITED STATES PATENTS

| | | |
|---|---|---|
| 2,204,919 | Tyler | June 18, 1940 |
| 2,328,091 | Nutt et al. | Aug. 31, 1943 |
| 2,507,050 | Roberts | May 9, 1950 |
| 2,524,975 | Hobbs | Oct. 10, 1950 |
| 2,775,330 | Schjolin et al. | Dec. 25, 1956 |
| 2,833,385 | Peterson et al. | May 6, 1958 |

UNITED STATES PATENT OFFICE
CERTIFICATE OF CORRECTION

Patent No. 2,939,558                  June 7, 1960

Hans O. Schjolin

It is hereby certified that error appears in the printed specification of the above numbered patent requiring correction and that the said Letters Patent should read as corrected below.

Column 4, line 55, after "chamber" and before the comma insert -- and a second chamber --; line 57, strike out "and a second chamber,"; column 7, line 16, for "delease" read -- release --.

Signed and sealed this 6th day of December 1960.

(SEAL)
Attest:

KARL H. AXLINE
Attesting Officer

ROBERT C. WATSON
Commissioner of Patents